United States Patent [19]

Tisserand et al.

[11] Patent Number: 4,529,302
[45] Date of Patent: Jul. 16, 1985

[54] METHOD AND APPARATUS FOR DATA RECORDING AND REPRODUCTION BY CONTINUOUS TRANSFER

[76] Inventors: Jacques Tisserand, 21 route de Montfermeil, 77500 Chelles; Serge Carganico, 9 bis rue du Lieutenant Chauré94100 Saint-Maur, both of, France

[21] Appl. No.: 506,608

[22] Filed: Jun. 22, 1983

[30] Foreign Application Priority Data

Jun. 22, 1982 [FR] France ................................ 82 10917
Sep. 9, 1982 [FR] France ................................ 82 15310

[51] Int. Cl.$^3$ ............................................. G03B 27/02
[52] U.S. Cl. ...................................... 355/79; 355/100; 355/102; 355/103; 355/112; 354/109
[58] Field of Search ............... 355/100, 102, 103, 112, 355/28, 79; 354/105, 109

[56] References Cited

U.S. PATENT DOCUMENTS

| | | | |
|---|---|---|---|
| 3,106,506 | 10/1963 | Anderau | 156/519 |
| 3,391,046 | 7/1968 | Quinn | 156/362 |
| 3,620,880 | 11/1971 | Lemelson | 156/384 |
| 3,901,639 | 8/1975 | Mandelson et al. | 425/371 |
| 4,181,554 | 1/1980 | Rich | 156/261 |
| 4,226,664 | 10/1980 | Shaffer | 156/499 |

FOREIGN PATENT DOCUMENTS

| | | |
|---|---|---|
| 847846 | 8/1952 | Fed. Rep. of Germany . |
| 3038202 | 4/1981 | Fed. Rep. of Germany . |
| 1574246 | 7/1969 | France . |
| WO82/00450-03 | 3/1982 | PCT Int'l Appl. . |
| 1243704 | 8/1971 | United Kingdom . |

Primary Examiner—L. T. Hix
Assistant Examiner—Della Rutledge
Attorney, Agent, or Firm—Fitzpatrick, Cella, Harper & Scinto

[57] ABSTRACT

The apparatus comprises a device for forming a latent image on a negative film according to data stored on a base medium; a first pair of transport rollers for pinching and carrying simultaneously the negative film and a receiving strip into a superimposition zone, the exposed film being developed into a treatment bath along said superimposition zone and a positive image being transferred by diffusion onto the receiving strip from the negative film; a second pair of transport rollers placed at the outlet of the superimposition zone, for pinching and carrying the receiving strip only; and registering means for sensing the advancing movement of the receiving strip and for controlling intermittently, at time intervals determined by the detection of guidemarks formed on the receiving strip, the production on the negative film of an image comprising a set of data stored discontinuously on the base medium.

28 Claims, 13 Drawing Figures

METHOD AND APPARATUS FOR DATA RECORDING AND REPRODUCTION BY CONTINUOUS TRANSFER

The present invention relates to an apparatus for data recording and reproduction by transfer, used for continuously transferring on to a support, by the photographic process of transfer by diffusion from an intermediate negative image, data discontinuously stored on a base medium, and comprising a device for forming a latent image on a negative film according to data stored on the base medium, a device for superimposing a receiving strip on the exposed negative film, and means for placing, before their superimposition, the exposed negative film and the receiving strip, in contact with a single treatment bath used for developing the negative film and, when superimposing the negative film on the receiving strip, for transferring onto said strip by diffusion a positive image from that developed on the negative film.

Attempts have already been made to continuously transfer the silver salts of an intermediate negative image on to a non-photosensitized strip placed in contact with the negative film immediately after the latter has been developed. Contrary to the case of the discontinuous treatment where only one image or only a small number of images are treated at a time, many difficulties are encountered with a continuous treatment due to the necessity of having to move synchronously two very long strips of materials having very different mechanical properties.

It has already been tried to force the materials to move in coincidental manner by means of perforations provided at regular predetermined intervals along each strip. But the mechanical reactions of the two materials have caused prohibitive strains to appear thereon, introducing a systematic error which cumulates and increases as the transfer-development process progresses.

It is the object of the present invention to overcome the aforesaid disadvantages and to permit the continuous development and transfer of the images of a very long negative film without any risk of noticeable displacement, braking or jerking in the forward movement of the strips, and which permits the use of non-perforated strips if necessary.

These objects are reached with the apparatus according to the invention, due to the fact that the device for superimposing the exposed negative film and the receiving strip comprises a first pair of transport rollers placed at the inlet of the zone of superimposition of the printed negative film and the receiving strip for gripping and carrying simultaneously the superimposed strip and film, and a second pair of transport rollers placed at the outlet of said superimposition zone, for gripping and carrying the receiving strip only, the film itself being moved by adhering to the receiving strip and detaching itself at the outlet from the said superimposition zone, and first registering means for sensing the advancing movement of the receiving strip are provided for controlling intermittently, at time intervals determined by the detection of guidemarks formed on the receiving strip, the production on the negative film of an image comprising a set of information stored discontinuously on the base medium.

According to the one particularly advantageous feature of the invention, the second pair of transport rollers is placed above the zone of superimposition of the negative film and the receiving strip, in order to keep said zone vertically straight by exerting a constant pulling action on the receiving strip.

The apparatus comprises means for applying the treatment bath on the receiving strip and on the film inside a treatment tank situated under the pair of transport rollers which simultaneously act as draining rollers.

The apparatus also preferably comprises means for recovering and recycling the treatment bath, which means are situated under the transport path of the negative film and receiving strip inside the treatment tank.

Preferably, the receiving strip and the film are laterally introduced into the treatment tank and have in said tank paths that are symmetrical with respect to a vertical plane defined by the superimposition zone.

In order to avoid the impoverishment of parts of the treatment bath, the receiving strip and the film are introduced into the transport rollers at respective angles varying between about 15° and 60°, from the vertical.

The receiving strip and the film may be introduced at the top of the treatment tank, each one forming a loop which is immersed into said bath.

The apparatus can also comprise means for storing additional information from the base medium during exposure of the negative film, and second registering means, synchronized with the first registering means provided for sensing the forward movement of the receiving strip, said second registering means being situated downstream of the superimposition zone, for controlling the registered printing on the receiver strip of the stored additional information.

The apparatus can comprise a light-proof external housing, means for washing, stabilizing and drying the receiving strip being provided at the outlet from the superimposition zone and upstream of the means, if any, for printing additional information.

Advantageously, the negative film exposure means comprise a lens associated to a flash lamp producing flashes at said predetermined intermittent moments.

The apparatus comprises means for automatically moving the base medium forward over a predetermined distance after each exposure of the film.

The base medium can be in the form of a continuous or zigzag-folded support, or in the form of a plurality of individual cards.

The apparatus according to the invention is particularly adapted to be used in the production of identification or similar documents and can then be combined with additional means for affixing security markings on the receiver strip, with third means for registering the images formed on the strip, with means for cutting the receiving strip with a view to taking a format therefrom, each format corresponding to an image transferred by the negative film, and with means for packing the cut-out formats.

Advantageously, the first, second and third registering means are constituted by sprocket wheels cooperating with perforations made in the receiving strip.

The means provided for packing the formats from the receiving strip consist in means for supplying and superimposing transparent strips of thermoplastic material, sealing and cooling means and means for cutting formats from the packed strip.

According to a preferred embodiment of the invention, the apparatus comprises means for cutting formats out of the receiving strip, each format corresponding to an image transferred from the negative film, first means feeding a lower strip of thermoplastic material, second means feeding an upper strip of thermoplastic material, means for first superimposing a format to be plastic-laminated on the lower strip of thermoplastic material, means for partially sealing a format superimposed on said lower strip of thermoplastic material, means for preheating each strip of thermoplastic material independently before superimposing them, and before heat-sealing the compound assembly resulting from the superimposition of the two thermoplastic strips and the format, heat-sealing and cooling means, means for stepwise moving and means for cutting the plastic-laminated formats.

Advantageously, the means for superimposing the upper thermoplastic strip on the format-carrying lower thermoplastic strip comprise a conveying assembly composed of two conveyor belts situated respectively under and above the transport path of the format-carrying lower thermoplastic strip, and of rollers permitting the application of a pressure on said compound assembly.

The apparatus comprises an equipment for sealing the surface of the compound assembly corresponding to a format which is situated downstream of the means used for pre-heating each one of the thermoplastic strips, on the transport path of the conveying assembly.

In this case, the installation further comprises means for cooling the compound assembly, which means are situated downstream of the equipment used for sealing the surface of the compound assembly, on the path followed by the conveying assembly, and means for sealing the periphery of the compound assembly around the format, consisting of lower and upper tools moving vertically, downstream of the path followed by the conveying assembly.

According to a particular feature of the invention, the means for locally sealing a format superimposed on the lower thermoplastic strip, comprise a heating tool, moving vertically inside a slot provided in a plate situated under the path followed by the lower thermoplastic strip in the area where a format is superimposed on a lower thermoplastic strip.

According to a special embodiment of the invention, the means used for superimposing a format to be plastic-laminated on the lower thermoplastic strip, are combined with means for cutting the receiving strip and comprises a punch which is vertically movable with respect to a die situated between the lower thermoplastic strip and the belt supplying the formats.

According to another special embodiment of the invention, in which the formats, cut from the receiving strip, are brought individually in pre-cut form in a magazine, the means provided for superimposing a format to be plastic-laminated on the lower thermoplastic strip comprise a gripping device constituted by a mechanism with arms mounted for pivoting about fixed axes and carrying members for gripping a format stored inside the magazine and bringing it in superimposition on the lower thermoplastic strip.

The pre-heating means which cooperate with the lower thermoplastic strip are situated between the outlet from the means used for superimposing a format on the lower thermoplastic strip and the conveyor assembly used for superimposing the upper thermoplastic strip on the format-carrying lower thermoplastic strip.

The pre-heating means which cooperate with the upper thermoplastic strip are situated under the part of the conveying belt which is situated above the path followed by the format-carrying thermoplastic strip, and which is used as a guide for the upper thermoplastic strip upstream of the input rollers of the conveyor.

The present invention also relates to a method which the apparatus according to the invention is particularly adapted to carry out.

Said method for data recording and reproduction by transfer, designed to transfer continuously onto a support, by the diffusion-transfer method, from an intermediate negative image, information stored on a base medium, consists in forming a latent image on a negative film in relation to the information stored on said base, superimposing on the exposed negative film a receiving strip, the negative film and the receiving strip being placed, before being superimposed, in contact with the same treatment bath for developing the negative film, and when superimposing the film on the receiving strip, transferring by diffusion of a positive image on to the receiving strip, the image developed on the negative film.

According to the invention, to perform the superimposition-transfer of the negative exposed film and of the receiving strip, the negative film and receiving strip are placed coincidentally at the inlet to the superimposition zone, then the film and the strip are pinched simultaneously where they coincide, in order to be moved simultaneously, and at the outlet from the said superimposition zone, only the receiving strip is pinched and moved, the film being moved by adhering to the receiving strip and detaching itself easily at the outlet from said superimposition zone, the forward movement of the receiving strip is registered in order to control intermittently, at time intervals determined by the detection of markings made in the receiving strip, the printing on the negative film of a set of information stored discontinuously on the base medium.

According to another feature, the method according to the invention comprises the further following steps:
cutting into individual formats, the receiving strip, downstream of the superimposition zone, each format corresponding to an image transferred by the negative film, and introducing the series of formats to be plastic-laminated stepwise successively between a lower thermoplastic strip and an upper thermoplastic strip, wherein the next format to be plastic-laminated is first superimposed on the lower thermoplastic strip, after which the said format is partly sealed on said lower thermoplastic strip, on the one hand, the lower thermoplastic strip on which the formats have been locally fixed, and on the other hand the upper thermoplastic strip, prior to the superimposition of the latter on the lower thermoplastic strip, are independently pre-heated, the compound assembly resulting from the superimposition of the two pre-heated thermoplastic strips and the format is heat-sealed and cooled, and the plastic-laminated formats are cut.

In this case, a pressure is advantageously applied on the compound assembly throughout a first sealing operation of the compound assembly surface corresponding to a format and a cooling operation consecutive to said first surface sealing operation.

The invention will be more readily understood on reading the following description, with reference to the accompanying drawings, in which:

FIGS. 2 and 2a are partial views of FIG. 1 showing front and profile views of a negative printing assembly, printing from a data-carrying base, the film-guiding plates having been removed from FIG. 2a.

Figure 1:
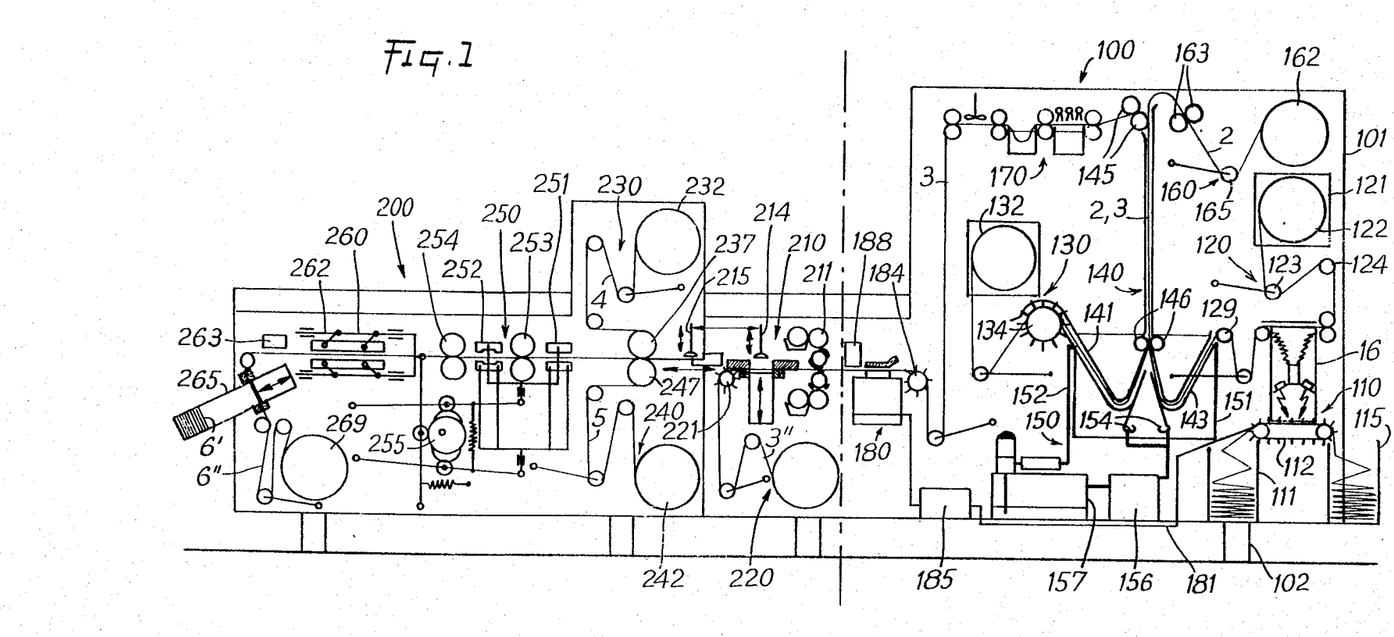
FIG. 1 is a diagrammatical overall view of an apparatus according to the invention combined with a packing machine.

The installation according to the invention, which is first described in reference to the overall view shown in FIG. 1 and to the detailed views shown in FIGS. 2 to 6, is particularly adapted for producing identification cards from information recorded on a base carrier 1 and which may originate either from a hand-operated file system, or from a computerized file system. The installation according to FIG. 1 enables, more specifically, the carrying out continuously of a succession of transfers, on to a receiver strip 3, of sets of information applied discontinuously by the base medium 1. One set of information can comprise for example, information relative to the civil status of an individual and graphical elements such as a photograph or a signature. The method used to record this type of information, by being a photographic method, has proved to be very flexible and capable of compiling, without any added complexity, black and white or colored information.

Figure 2:
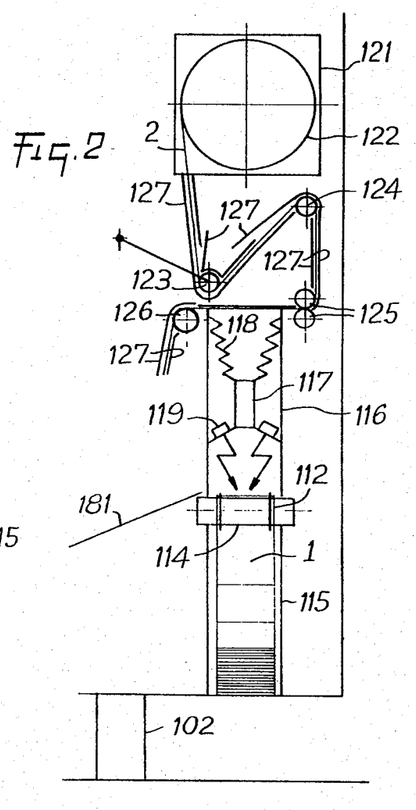
Figure 2A:
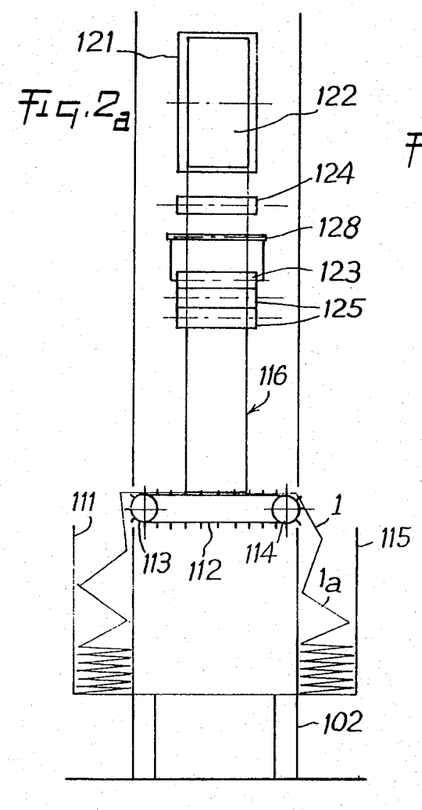

FIGS. 2 and 2a illustrate a photographic station used for sequentially recording data carried by a base medium 1 constituted by a continuous zigzag-folded strip, each fold 1a of which comprises a set of information to be reproduced on a receiving strip 3. The data recording stage 110, mounted on the frame 102 of the installation, comprises a magazine 111 for storing the base medium 1, a conveyor member 112 mounted on rollers 113, 114 and equipped, for example, with sprocket chains designed to cooperate with perforations made in the base carrier 1, and a receiving magazine 115 designed to store the folds of plies 1a of the base carrier after its passage on the conveyor 112. Said conveyor 112 is controlled so as to move forwards stepwise and to bring into position one by one under the photographic apparatus 116, successive plies 1a carrying sets of information. The photographic apparatus 116 comprises means 119 for lighting up a window situated above the conveyor 112 and before which said plies 1a are brought successively in position. Advantageously, said lighting means are flash-lights, electronically controlled for an automatic reading of the contrasts on the base carrier 1. The lens 117 and bellows 118 permit the reproduction on a negative film of the image of the initial set of information.

The roller 122 of film 2 designed to constitute a negative after exposure to the light is mounted inside a cartridge 121 forming the reel of a film-supplying assembly and is guided by a plurality of guide-pulleys 123, 124, 125, 126 so as to present a path of which one section, parallel to the conveyor 112, faces the photographic apparatus 116. The tension of the film 2 is controlled by the guide-pulley 123 mounted so as to oscillate with respect to the frame. All along its path, the film 2 is protected and guided by structures 127. Moreover, the information recording device 110, as well as the other devices 120, 130, 140, 150, 170, which are described hereinafter, are placed inside a light-proof housing 101 forming part of the installation. It will be noted that the film 2 which is guided by pulleys 123, 124, 125 before being exposed in front of the photographic apparatus 116, and then by pulleys 126, 128, 129 (FIG. 3) after exposure, can move either continuously, for example at a speed of around 1.50 m per minute, or discontinuously. Tension of the film is ensured on the one hand by the pulley 123 connected to the pre-reeling arm 129 and on the other hand by the pulley 128 which is also connected to a pivoting arm permitting a compensation and recuperation after a pause in the forward movement of the film 2, due to exposure of the film from a set of data. It should however be noted that in the case where flash lamps 119 are used, which lamps give flashes of very short duration (about 1/10,000th of a second), in relation to the advancing speed of the film, said film can move on continuously without stopping, even whilst being exposed. This is a great help to the operation of the installation, because it prevents the film from advancing jerkily. The stepwise advance of the base carrier 1 can be automatically controlled between every photographic session.

Figure 2B:
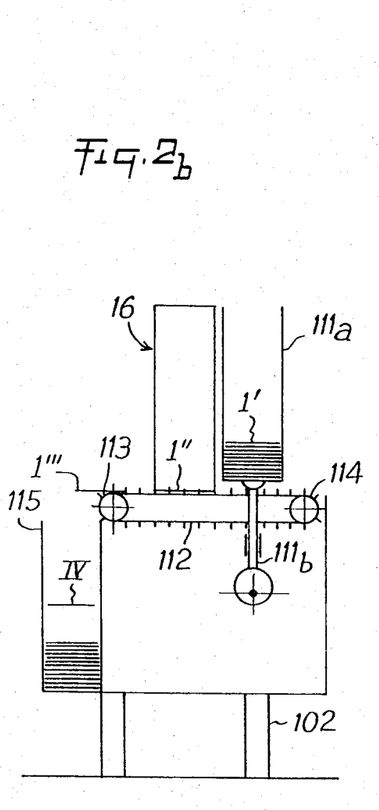
FIG. 2b illustrates a variant embodiment of the device shown in FIG. 2a with a base medium constituted of discontinuous elements.

FIG. 2b shows a variant embodiment of the device 110 in which the base medium is constituted by a stack of pre-cut individual cards 1', stored in a magazine 111a. A controlled holding member 111b releases the cards 1' one by one, said cards falling on to the conveyor 112 and being brought into position 1" under the photographic apparatus 116. After exposure of the film (not illustrated in FIG. 2b), similarly to what is illustrated in FIGS. 2 and 2a, a card 1''' is picked up by the conveyor 112 and removed towards the magazine 115 where cards 1'''' are recovered. The conveyor 112 can of course comprise margin-forming guiding means (not shown), for positioning a card 1 under the photographic apparatus 116.

The photographic operations are controlled in relation to the forward movement of a receiving strip 3 (FIG. 3) on which strip the image formed on the film 2 will be transferred by contact. Said receiving strip 3 which comprises no photosensitizing emulsion, but can be coated on one of its faces with a layer of polyethylene, said layer being itself coated with a layer of gelatin to confine any germs liable to aid the transfer of the silver salts of the negative 2 which have not been exposed to sunlight, is stored in reel form 132 inside a cartridge 131 and, following a counter-movement on a pulley 133 connected to a pivoting reeling arm, and on a wheel 134 such as an idly mounted sprocket wheel, penetrates into a treatment enclosure 151. Structures 135 protect and guide on each face, the receiving strip 3 right through its path. Said strip 3, enclosed in a perforated guiding channel 141, having penetrated into the treatment enclosure 151, is gripped after being caused to reverse on a pulley 142, by a pair of transport rollers 146. The film 2 guided and protected by the guiding channels 127, 144 also penetrates into the enclosure 151 and is also gripped by rollers 146 after being diverted on to a pulley 144, and then superimposed on the receiving strip 3, the emulsion face of the negative 2 being in contact with the layer of germs deposited on the receiving strip 3. A continuous and simultaneous feeding of the receiving strip 3 and of the exposed film 2 is thus created at the level of the pair of rollers 146. Due to the fact that said rollers are smooth, the feeding is jerkless, and without risk for the strips. The sprocket wheel 134 which cooperates with perforations made in the strip 3 actuates a microswitch in order to deliver a pulse at every turn, said pulse controlling a photographic operation. Said operations are thus always dependent on the forward movement of the strip 3 and of the film 2 which film is itself driven by the rollers 146. If for some reason the forward speed of the strip 3 varies, the photographic operations are also either spaced out more, or brought closer together, to account for the corresponding alteration of the forward speed of the film 2.

Figure 3:
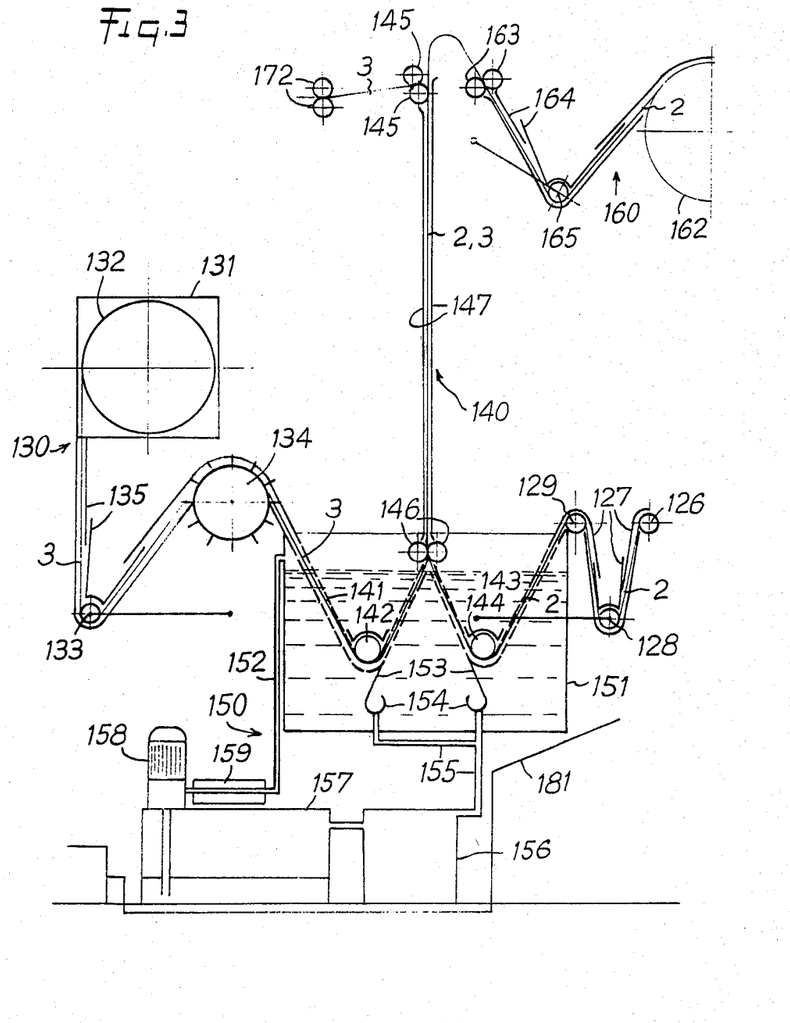
FIG. 3 is an enlarged view of part of FIG. 1 showing the device used for developing and transferring images from the printed negative film on to a receiving strip.

Other registering members could of course be used instead of the sprocket wheel 134 to detect any markings of perforations made in the strip 3. One important fact to be noted is that the photographic operations and the operations of exposure of the film 2 should be controlled from the strip 3, because said strip, in the manufacture of identification cards in particular, already contains elements such as watermarks, or pre-printed mentions, the position of which has an importance with respect to the images to be formed from the sets of information recorded on the base medium 1. But according to the invention, and due to the fact that the strip 3 and film 2 are moved by a common member 146 situated at the start of the transfer of the image formed on the film 2, the positioning with respect to the receiving strip 3 of the images formed on the film 2 has proved to be particularly accurate.

The film 2 is developed in a single bath situated inside the enclosure 151. The developing fluid is introduced through pipe 152 at the upper part of the tank 151, which fluid wets the strip 3 and develops the latent images of film 2 along the path situated inside the developing tank 151. The feeding rollers 146 situated at the top part of enclosure 151, above the level of the liquid are also used as squeezing rollers. Suction tubes 153, 154 situated on the path of the strip 3 and film 2, enable recovery of the treatment liquid at the lower part of said tank 151, to remove the used bath through conduits 155 towards a decanting tank 156, and then into a regeneration chamber 157. The recycled bath can then be pumped with a circulation pump 158, returned to the right temperature in an exchanger 159 and re-injected into the treatment enclosure 151 through pipes 152.

As illustrated in FIG. 3, the receiving strip 3 and the film 2 are introduced at the upper part of the treatment tank 151, laterally on two opposite sides situated on either side of the pair of pressing rollers 146. The film 2 and receiving strip 3, guided respectively by two perforated guiding channels 143, 141, are immersed into the bath contained in the tank 151, and, after being diverted via pulleys 144, 142, are introduced through the bottom, between the pressing rollers 146. The paths followed by the strip 3 and the film 2 inside the tank 151 are substantially symmetrical with respect to the vertical plane defined by the zone where the film 2 and the strip 3 are superimposed above the rollers 146. Likewise, the overall path followed by the receiving strip 3 between the reel 131 and the pressing rollers 146 is preferably about as long as the path followed by the film 2 between the photographic station 16 and the pressing follers 146. The photographic station 110 is itself situated in the immediate vicinity of the tank 151, on one side with respect to the plane of the superimposition zone 2, 3, whereas the reel 131 feeding the strip 3 is situated close to the tank 151 whilst being symmetrical to the photographic station 110 with respect to the superimposition zone 147.

The film 2 and strip 3 are directed by guide-pulleys 144, 142 towards the pressing rollers 146, by forming an angle varying between about 15° and 60° and preferably around 30° with respect to the vertical which corresponds to the plane of the superimposition zone 147. This makes it possible to clear inside the tank 151 a triangular zone which prevents the concealment of a fraction of non-renewed bath under the pressing rollers 146.

The transfer operation on to the receiving strip 3 is achieved after the developed film 2 has been placed in contact with the strip 3 wetted with the liquid, at the level of the feeding and pressing rollers 146. The transfer operation is made possible owing to a zone of superimposition of the film 2 on the strip 3, created above the feeding rollers 146. Said zone of superimposition may be limited by two side plates 147 situated on either side of the superimposition strip 3/film 2. The length of said zone is selected in relation to the moving speeds of the strip 3, so that the time of transfer by contact of the silver salts of the film 2 with the receiving strip 3 can be fully completed. Said transfer time can be around 45 seconds for example. In the superimposition zone, the film 2 is moved by adhering to the receiving strip 3 whereas a pair of rollers 145 grips the receiving strip 3 at the outlet from the superimposition zone, in order to keep the strip in a stretched condition and to aid its movement at a constant tension. It will be noted that the film 2 which, at the inlet of the superimposition zone is driven by the pair of rollers 146, can easily detach itself, forming a loop, at the outlet from said zone. Thus, there is no special pressure exerted on the film 2 and the disadvantages of the prior art due to a greater retraction of the negative film 2 with respect to the strip 3, are eliminated, since the film 2 does not need to be moved by way of a sprocket wheel. The negative 2, upon automatic separation from the strip 3 at the outlet from the superimposition zone 147, is conventionally picked up by rollers 163, 165 and by guiding plates 164, for recovery on a reel 162 and subsequent removal and destruction.

Figure 4:
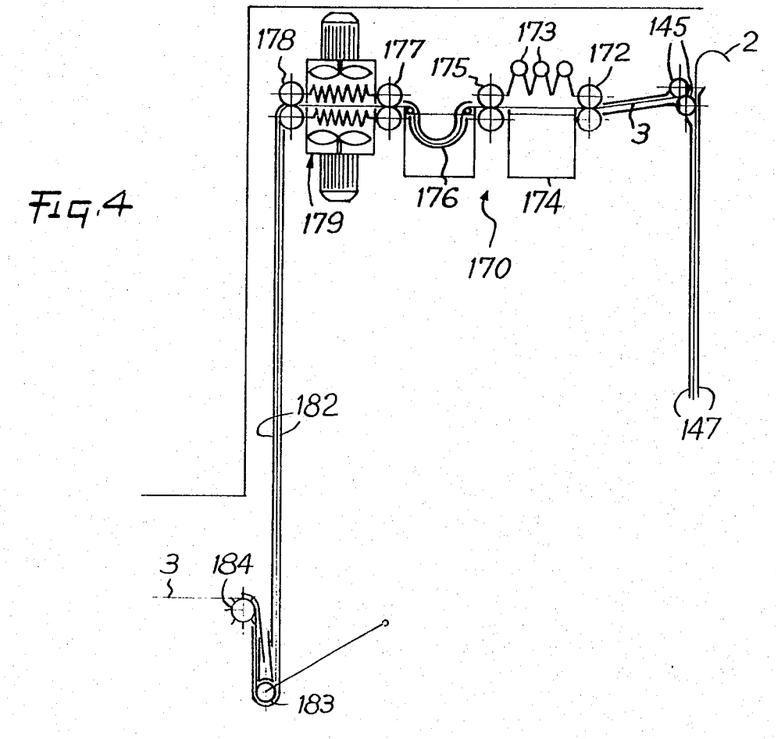
FIG. 4 is a partial view of FIG. 1, showing the means for rinsing, stabilizing and drying the image formed by transfer on the receiving strip.

The strip 3, having been picked up by the pressing rollers 145, is driven towards a washing, stabilizing and drying assembly 170. Said strip 3 is introduced via rollers 172 into a washing station equipped with spraying nozzles 173, and a receiving tank 174, and via rollers 175 into a stabilizing station 176 with a view to preventing any subsequent alteration of the silver salts which have been transferred on the strip 3 during the subsequent treatment operations. Finally, said strip 3 is introduced via rollers 177 into a drying station 179 before being removed through outlet rollers 178 towards an assembly 180 proceeding to the recording of additional information.

Figure 5:
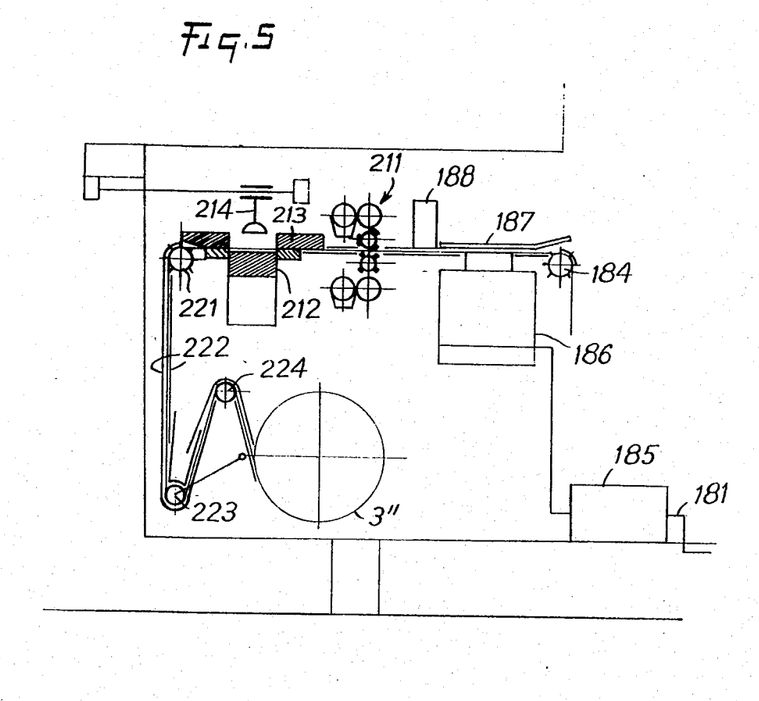
FIG. 5 shows a sub-assembly of the apparatus of FIG. 1 permitting the printing of additional information on to the receiving strip and to cut the latter into strip sections.

In the case where additional information recorded on the base medium 1 have to be entered, not by a photographic process, but transferred instead by another reproduction means, such as for example by printing on the back of the receiving strip 3, during the photographic operation in station 110 where data is recorded, the additional data is stored in a standby station 185, through line 181, in synchronism with the base medium reading sequence given by the member 134 controlling the feed of the strip 3, after which they are taken to a printing station 186, 187, 188 at a predetermined time by the wheel 184 registering the feed movement of the strip 3. The sprocket wheel 184, which is synchronized with the wheel 134 gives the orders to print the additional information.

Once the additional information have gone through the printing station, the receiving strip 3 can be rewound for temporary storage before being cut and used. In this case, the stored strip can thereafter be introduced into a plastic laminating machine 200 using the heat-sealing method (FIG. 6), and working quite independently of the machine 100 used for recording data and reproduction by transfer. But, as illustrated in FIG. 1, the plastic-laminating machine 200 can be mounted in alignment with the installation 100, thus permitting a continuous treatment giving finished products 6' which are in the form of plastic-laminated information-carrying cards.

In a first assembly 210 situated upstream of the actual plastic-laminating machine 200, the strip 3 which is fed from the printing station 180 is provided with security elements, such as luminescent markings, arranged according to a predetermined design. Said markings are designed to characterize the origin of the manufacture of the strip and to prevent falsifications.

The assembly 210 further comprises means (punch 212 and die 213) for cutting formats with accurate registering with for example a sprocket wheel 221 of the type of wheels 134, 184, which wheels can for example be provided with twelve sprockets which at each turn advance the strip 3 of one image length. Each format 3' cut from the strip 3 corresponds to one of the images formed by diffusion transfer from the sets of information recorded at photographic station 110. What is left 3" of the strip 3 is removed through guide-plates 222 and rollers 223, 224 before being rewound and destroyed. A margin stop 214, 215 comprising for example suction-type gripping elements, secure the cut formats 3' in position in the actual plastic-laminating machine.

Figure 6:
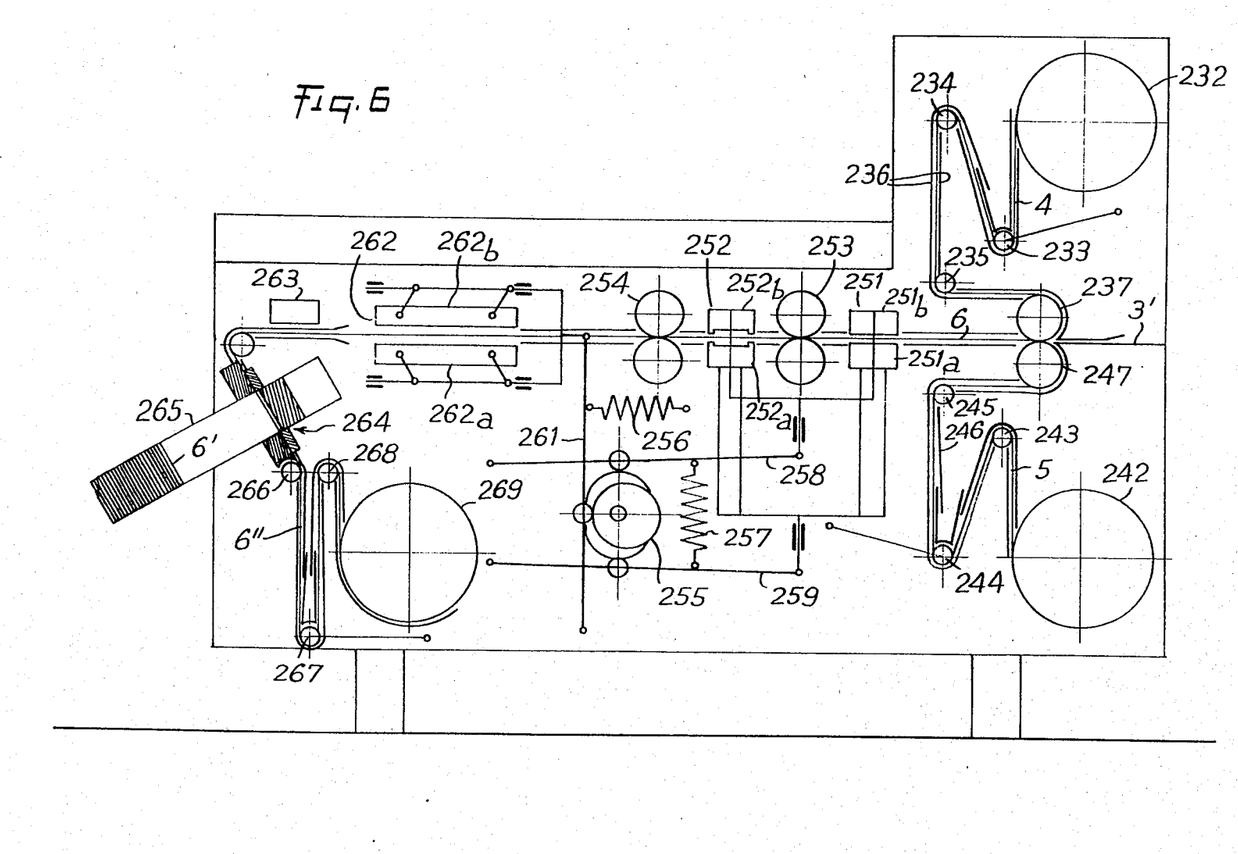
FIG. 6 is a view of the device used for plastic-laminating a strip section issued from the device shown in FIG. 3.

Two strips of thermoplastic material 4, 5 are brought between top 237 and bottom 247 laminating rollers which may be heating rollers. The upper strip 4 is fed from an upper unit 230 feeding thermoplastic material and comprising a reel 232, guide-pulleys 233, 234, 235 and guide-plates 236. Pulley 233 is associated to a pivoting arm so as to keep the strip stretched whilst reeling out the strip 4. In like manner, the lower strip 5 is fed from a lower feed unit equipped with a reel 242, guide-pulleys 243, 244, 245 and guide-plates 246. Pulley 244 is also associated to a pivoting arm and plays the same part as pulley 233.

Downstream of laminating rollers 237, 247 the sandwich 6 resulting from the superimposition of the strips 4 and 5 with a format 3' inserted therebetween, is taken to a heat-sealing stage 250 and to a stage 260 where it is cut into final cards 6'. The heat-sealing stage comprises an equipment 251 for sealing the surface of the sandwich 6 corresponding to a format 3', with vertically movable lower 251a and upper 251b equipments, one pair of cooling cylinders 253, an equipment 252 for sealing the periphery of the sandwich 6 around the format 3', with vertically movable lower 252a and upper 252b tools, and one pair of second cooling cylinders 254. Clamps 262, optionally cooled by a flow of water, with lower 262a and upper 262b jaws, grip the sandwich 6 after the heat-sealing operation, to bring it in front of a device 263 controlling the presence of security elements previously introduced in the format 3', and then to a cutting device 264 using a punch and die, which is adapted to eject into a receiving magazine 265, the cut and plastic-laminated final cards 6', whereas what is left 6" of the strips of plastic materials 4 and 5 is removed after deviation over pulleys 266, 267, 268 towards a reel 269.

The longitudinal stepwise displacements of the clamps 262, as well as their opening or closure, and the vertical movements of the upper parts 251b, 252b of the heat-sealing tools, are synchronously controlled from a mechanism comprising cams 255, control levers 258, 259 and return-springs 256, 257. The step-by-step progress of the sandwich 6 through stages 250 and 260 is as follows. By a rotation of the rollers 237, 247; 253 and 254, which are all synchronized, a format 3', presented by the margin stop 214, 215, is introduced between the two upper 4 and lower 5 strips of thermoplastic material, at the level of the laminating cylinders 237, 247 which bring to the first heat-sealing station 251 the portion of the sandwich 6 containing the format 3'. The portion of sandwich 6 containing the preceding format 3' and which has already been heat-sealed at station 251 is moved by the cooling cylinders 253 towards the second heat-sealing station 252. Likewise, the preceding portion of sandwich 6 containing another format 3' which has already been heat-sealed at station 252 is gripped by the clamp 262 to be brought to the cutting device 264 via the reading apparatus 263. The sandwich 6 stops moving whilst the clamp 262 returns empty, and the heat sealing devices 251, 252 start operating and the margin stop 214, 215 controlled by the image registering wheel 221 brings another format 3' at the inlet of the laminating cylinders 237, 247. Another one-step-forward cycle can then start.

In general, the present invention is particularly advantageous insofar as, when the data is recorded and reproduced by diffusion transfer, a control of the receiving strip 3 is permanently possible, for example by means of perforations made along the longitudinal edges of said strip, whereas the film 2 does not intervene in said control and only acts as follower. Thus, it is possible to avoid the disadvantages of other systems in which both the film 2 and the receiving strip 3 play a registering part, which disadvantages are essentially due to the different mechanical properties of the film 2 and strip 3 preventing the formation of regular markings at regular intervals both on the film and on the strip.

Moreover, a photographic device 110 is described hereinabove which is adapted to make instant recordings of information supplied discontinuously, (for example at a few seconds intervals) from a mechanical data base constituted by fanfold paper 1 of individual cards 1'. The installation according to the invention, the advantages of which are essentially due to the way in which the film 2 and the receiving strip 3 cooperate together, can also be applied to the recording of data supplied from other types of data bases, such as for example a display screen which would be fitted opposite the window of the photographic apparatus 16, if the data is supplied from a computerized file for example In the case of a data display using for example a laser beam, the lighting means 119 are of course no longer necessary and the photographic apparatus 16 designed to form the image of the sets of displayed information on the negative 2 only now needs the lens 117 and chamber 118.

It is also possible to use information recorded on a base medium in digital form which can be directly decoded and transferred on to the negative film 2 by way of a controlled laser beam for example, without having to proceed to an intermediate display or to use a lens 117.

The base medium 1 can thus have varied structures and be constituted by magnetic tapes, discs, or other types of memories in which the information is recorded electrically or magnetically. The recorded information reading device, which is used to expose the negative film 2 by transferring thereon sets of information successively read from the base medium 1, can thus be of various design.

It is indicated hereinabove that it is possible to use a plastic-laminating machine by heat-sealing 200, giving finished products 6' in the form of plastic-laminated cards carrying information said cards being efficiently protected, by said plastic-lamination, against wear and falsification, the finished products 6' being thus convenient to constitute identification cards for example. FIGS. 7 to 11 illustrate advantageous variants of the plastic-laminating machine shown in FIG. 6.

Figure 7:
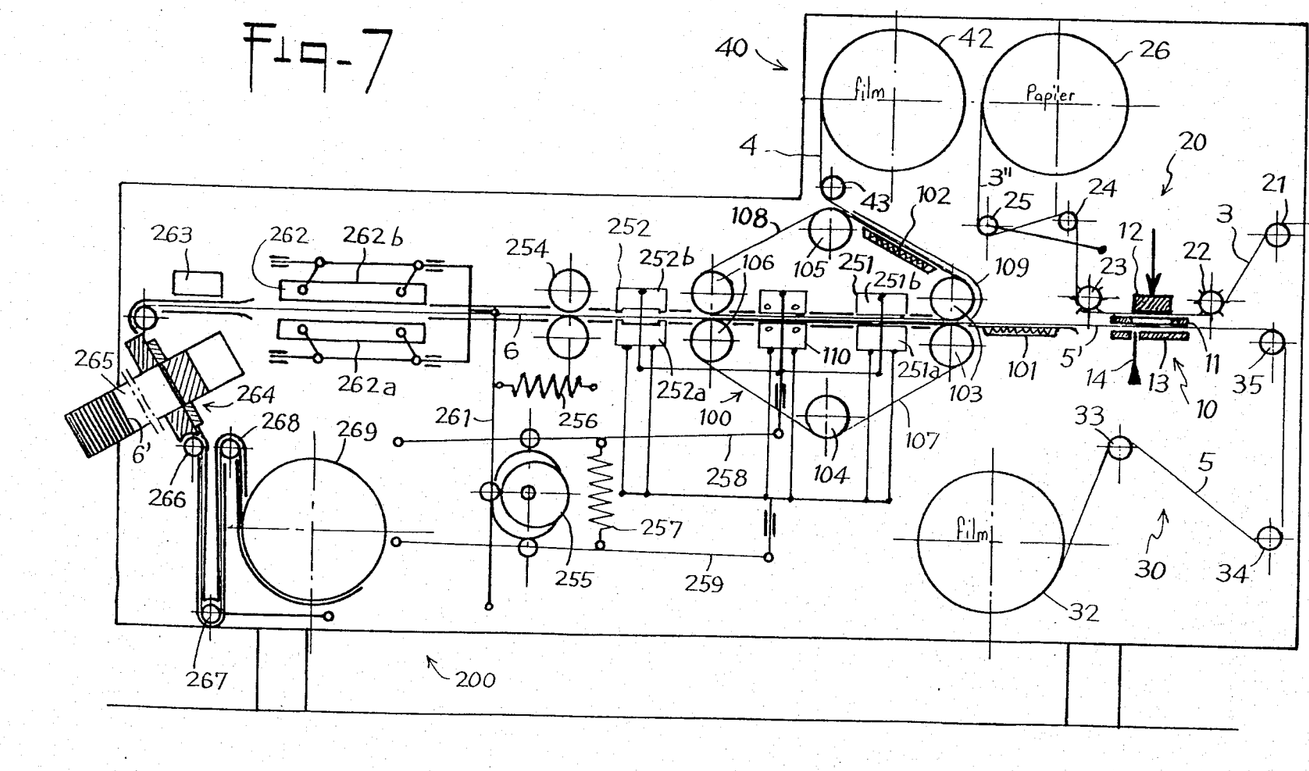
FIG. 7 is a general diagram of an apparatus according to the invention capable of carrying out the plastic-laminating of cards.

At the inlet to the plastic-laminating machine 200 shown in FIG. 7, there is an assembly 20 forming individual elements in card or format 3' form from a continuous strip 3 of paper for example, and superimposing formats 3' with a strip 5 of thermoplastic material fed from a feeding device 30. Means 10 are also associated to assembly 20 for superimposing formats 3' with the thermoplastic strip 5 to secure locally each format 3' in a predetermined position on the lower thermoplastic strip 5.

The assembly 20 forming the formats 3' comprises means for cutting formats with a vertically movable punch 12 and a die 11 placed under said punch. Sprocket drive wheels 22, 23, enable registration of the advance of the strip of material 3 from which the formats 3' are to be cut. It is thus easy to produce individual cards each of which carries a well-defined image. The wheels 22, 23 can, for example, comprise twelve sprockets, at every turn advancing the strip over the length of one image. Each format 3' can then correspond to one of the images being part of a succession of images regularly spaced on the strip which is guided by the roller 21 upstream of the cutting device 12, 13. The cut out strip 3" of the strip 3 is removed by being guided by pulleys 24, 25 before being re-wound into a reel for subsequent disposal.

Figure 8:
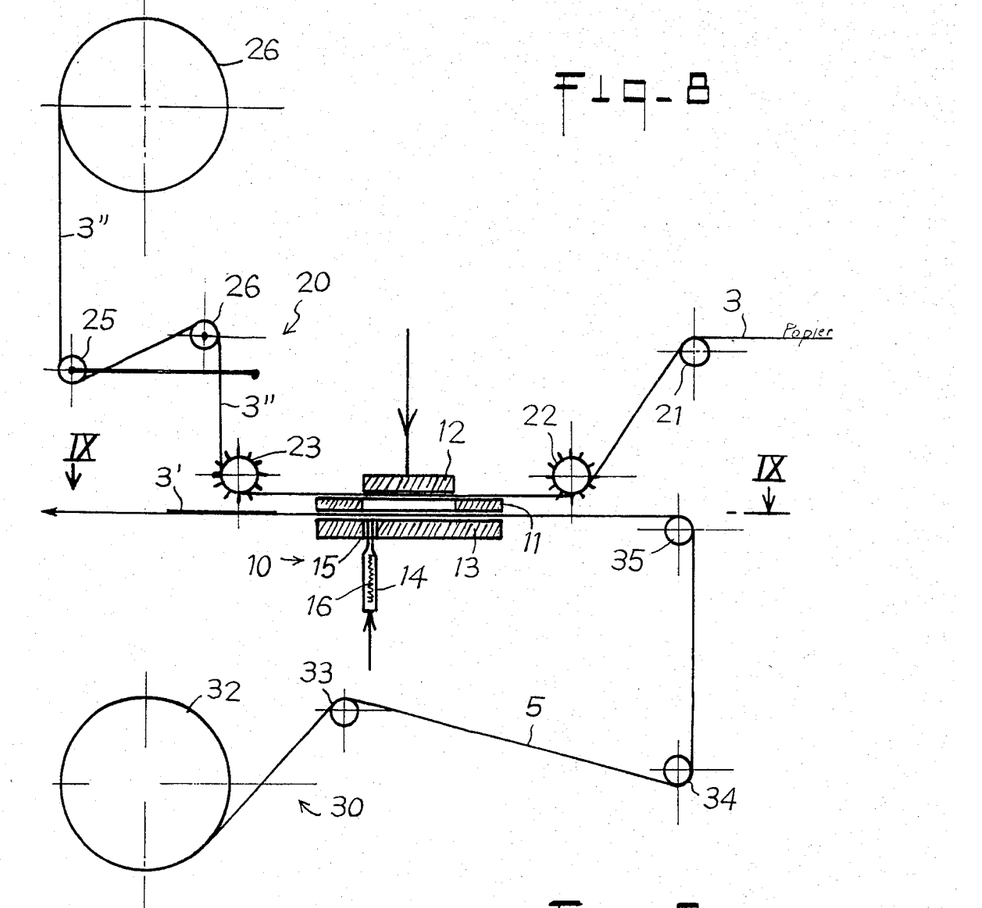
FIG. 8 is a detailed view of a special embodiment of a device for feeding cards or formats to a plastic-laminating machine according to the invention.
Figure 9:
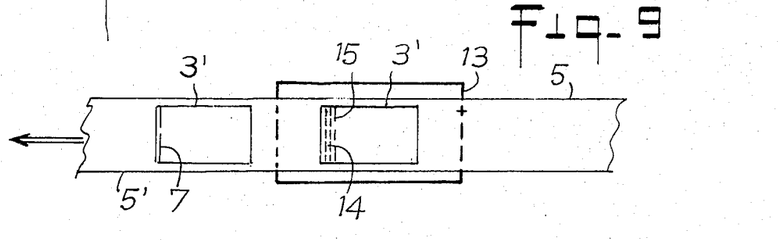
FIG. 9 is a view along plane IX—IX of FIG. 8.

The lower thermoplastic strip 5 is brought from a lower assembly 20 supplying the plastic material and comprising a reel 32, guide-pulleys 33, 34, 35 and optionally guide-plates. As shown in FIGS. 8 and 9, a plate 13 is placed under the path of the lower thermoplastic strip 5, level with the die 11, i.e. under the zone where a format 3' cut with the punch 12 into the strip 3 is superimposed on the thermoplastic strip 5. A slot 15 is provided in the plate 13 close to the downstream part of the opening of the die 11 to allow the passage of a heating member 14 equipped for example with an electric heater element 16. Said heating member 14, whose head may be ridged-shaped, the ridge being perpendicular to the moving direction of the thermoplastic strip 5, is vertically movable so as to be brought over the thermoplastic strip 5 to heat parts of same at predetermined moments, corresponding to the presence of a format 3' in the die 11. Said thermoplastic strip 5, which can be transparent, can comprise an external face protected for example by a layer of polyester, and an inner face in contact with a card 3' in polyethylene. When a card has been cut out of the die 11, the punch 12 continues for a brief moment to press the card 3' against the inner face of the thermoplastic strip 5, whose outer face bears against the support plate 13, whereas the heater element 14 is moved upwardly and is brought to heat the thermoplastic strip 5 locally, causing the card 3' to be fixed partly and punctually by heat-sealing to the strip 5. The local sealing operation being completed, the punch 12 is raised up whereas the heater element 14 is lowered down and the lower strip 5 which was stationary, is moved by one step, carrying the format 3' fixed along a sealing line 7 and constituting a format-loaded strip 5'. Obviously, the heater element 14 can be of different shapes adapted to the type of local sealing which is required, and could also be situated elsewhere than close to the downstream part of the opening of the die 11 with respect to the moving direction of the strip 5. However, a localized sealing 7 close to the front edge of the formats 3' has been found to be very advantageous.

Figure 10:
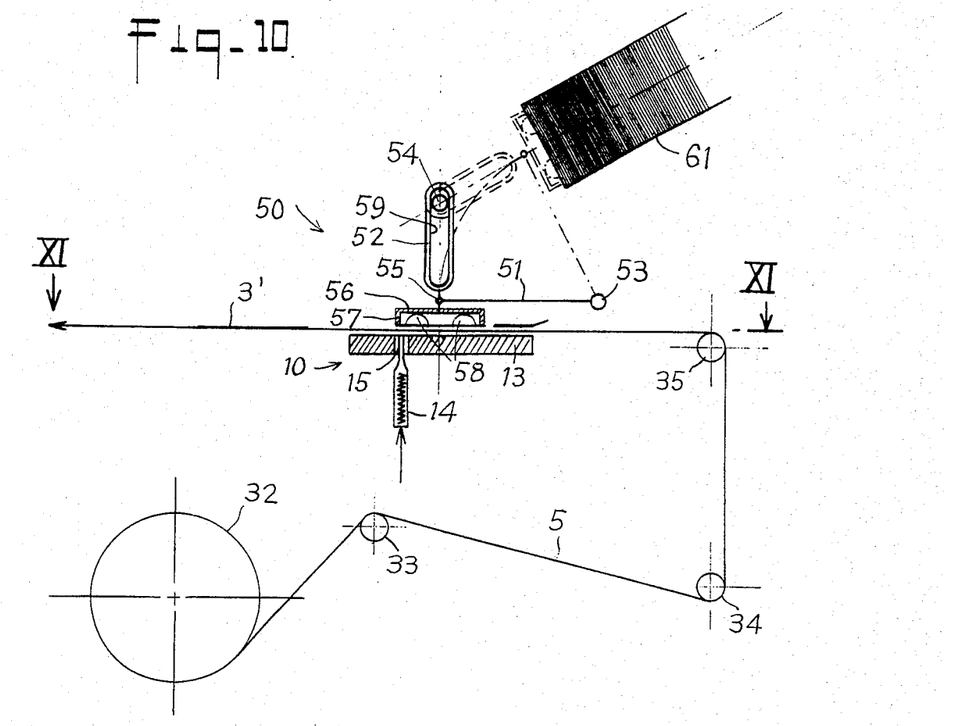
FIG. 10 is a detailed view of a second embodiment of a device used for feeding cards or formats to a plastic-laminating machine according to the invention.
Figure 11:
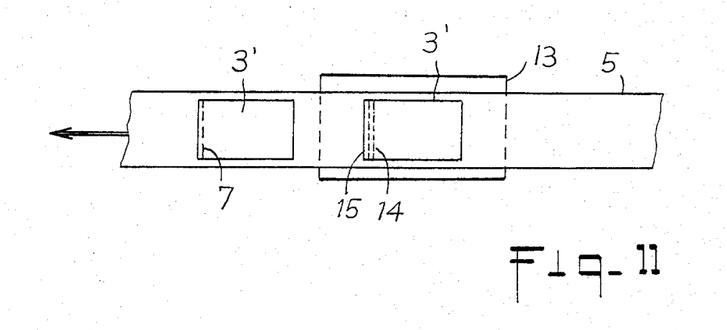
FIG. 11 is a view along plane XI—XI of FIG. 10.

FIGS. 10 and 11 illustrate another embodiment of means for superimposing formats 3' on a thermoplastic strip 5.

According to this second embodiment, the device 30 feeding the thermoplastic strip remains unchanged, as well as the heater element 14 which cooperates with a plate 13. The cards 3' to be plastic-laminated on the contrary, are pre-cut and stored inside a magazine 61. The means 50 for superimposing the cards 3' on the strip 5 can then be structurally different from the assembly consisting of the punch 12 the die 11 of FIG. 8. Said means 50 can comprise a margin-stop composed of a gripping head 56 equipped with suction members 58 or other gripping means, said head being mounted for pivoting by way of two arms 51, 52 about two fixed axles 53, 54. The gripping head 56 is joined by way of a hinged connection 55, on the one hand to the end of an arm 51 whose other end is connected to the fixed pivoting axle 53, and on the other hand, to the end of a hollow arm 52 provided with a slot 59 which enables the head to pivot about a second fixed axle 54 engaged through said slot 59. The gripping head 56 can thus grip a card 3' when it is pivoted upwards (as shown in dotted lines in FIG. 10) and then bring said card on the strip 5 when it is pivoted downwards (as shown in block lines in FIG. 10). The edge 57 of the gripping head 56 is also used as an abutment for a format 3' when the heater element 14 is raised to seal parts of the format 3' on the strip 5.

Referring back to FIG. 7, this shows that a pre-heating element 101 is provided close to the strip 5' carrying the formats 3', downstream of the partial sealing means 10, to bring said strip 5' to a temperature below melting point.

A similar pre-heating element 102 is provided close to the path followed by the thermoplastic strip 4 which strip is brought from the upper assembly 40 supplying thermoplastic strip and comprising a reel 42, a guide-pulley 43 and a guide-plate 109.

The lower 5' and upper 4 thermoplastic strips are introduced simultaneously into a conveying device 100, downstream of the preheating elements 101, 102. Said conveying device 100 comprises one pair of input pressure rollers 103 and one pair of output pressure rollers 106 and two lower 107 and upper 108 conveyor belts which can be metallic or even coated with polytetrafluorethylene. The lower conveyor belt 107 runs over lower rollers 103, 106 and a lower tension roller 104 whereas the upper conveyor belt 108 runs over upper rollers 103, 106 and an upper tension roller 105. On their path which is straight and parallel to the path of the compound strip 6 composed of the lower thermoplastic strip 5' carrying the formats 3' and the upper thermoplastic strip 4, the belts 107 and 108 exert a pressure on the compound strip 6 whilst continuing to move same. Said sandwich-like compound strip 6 is thus held between two planes throughout its path, during which it is subjected to a heat-sealing of its surface with an equipment 251 consisting of vertically movable lower tools 251a and upper tools 251b, and to active cooling by means of cooling means 110 situated downstream of the equipment 251 used for sealing the surface of the sandwich 6.

The presence of the belt conveyor means 100 leads to a final product of better appearance perfectly flat, and the presence of active cooling means 110 guarantees the formation of an envelope in plastic material which will be more transparent than if the cooling had been gradual.

An equipment 252 for sealing the periphery of a compound assembly 6 around a format 3', with vertically movable lower 252a and upper 252b tools, and a pair of cooling cylinders 254 are fitted after the conveyor means 100.

The cutting device 264, clamps 262, heat-sealing tools 251, 252 and the mechanism 255 controlling said elements are similar to the corresponding devices in FIG. 6 and will not be described again.

In the case illustrated in FIG. 7, the stepwise progress of the compound strip 6 through stages 100, 250 and 260 is as follows. By a rotation of the rollers 103, 106 and 254 which are synchronized, a format 3', carried by the lower strip 5, is introduced on the upper plastic material 4 at the level of the cylinders 103 of the conveyor device 100, which cylinders bring the portion of compound strip 6 containing the format 6' up to the first heat-sealing station 251. The portion of the compound strip 6 containing the preceding format 3' and which has already been heat-sealed at station 251 is cooled by cooling means 110, and carried towards the second heat-sealing station 252. Likewise, the portion of compound strip 6 which contains another preceding format 3' already sealed at station 252 is gripped by the clamp 262 and taken to the cutting device 264 via the reading device 263. During the return of the empty clamp 262 to its initial position, the advance of the compound strip 6 is stopped, the heat-sealing devices 251, 252 are brought into action and the punch 12 can prepare another format 3' which will be thereafter brought to the input 103 of the conveyor device 100. Another one step forward cycle can thus be started.

What we claim is:

1. An apparatus for data recording and reproduction by transfer, used for continuously transferring onto a support, by the photographic process of transfer by diffusion from an intermediate negative image data discontinuously stored on a base medium, and comprising a device for forming a latent image on a negative film according to data stored on the base medium, a device for superimposing a receiving strip on the exposed negative film, and means for placing, before their superimposition, the exposed negative film and the receiving strip, in contact with a single treatment bath used for developing the negative film and, when superimposing the negative film on the receiving strip, for transferring onto said strip by diffusion a positive image from that developed on the negative film, wherein the device for superimposing the exposed negative film and the receiving strip comprises a first pair of transport rollers placed at the inlet of the zone of superimposition of the printed negative film and the receiving strip for gripping and carrying simultaneously the superimposed strip and film, and a second pair of transport rollers placed at the outlet of said superimposition zone, for gripping and carrying the receiving strip only, the film itself being moved by adhering to the receiving strip and detaching itself at the outlet from the said superimposition zone, and first registering means for sensing the advancing movement of the receiving strip are provided for controlling intermittently, at time intervals determined by the detection of guidemarks formed on the receiving strip, the production on the negative film of an image comprising a set of information stored discontinuously on the base medium.

2. The apparatus according to claim 1, wherein the second pair of transport rollers is placed above the zone of superimposition of the negative film and the receiving strip, in order to keep said zone vertically straight by exerting a constant pulling action on the receiving strip.

3. The apparatus according to claim 2, further comprising means for applying the treatment bath on the receiving strip and on the film inside a treatment tank situated under the pair of transport rollers which simultaneously act as draining rollers.

4. The apparatus according to claim 3, further comprising means for recovering and recycling the treatment bath, which means are situated under the transport path of the negative film and receiving strip inside the treatment tank.

5. The apparatus according to claim 3, wherein the receiving strip and the film are laterally introduced into the treatment tank and have in said tank paths that are symmetrical with respect to a vertical plane defined by the superimposition zone.

6. The apparatus according to claim 3, wherein the receiving strip and the film are introduced into the transport rollers at respective angles varying between about 15° and 60°, from the vertical.

7. The apparatus according to claim 3, wherein the receiving strip and the film are introduced at the top of the treatment tank, each one forming a loop which is immersed into the treatment bath.

8. The apparatus according to claim 1, further comprising means for storing additional information from the base medium during exposure of the negative film, and second registering means, synchronized with the first registering means provided for sensing the forward movement of the receiving strip, said second registering means being situated downstream of the superimposition zone, for controlling the registered printing on the receiver strip of the stored additional information.

9. The apparatus according to claim 1, further comprising a light-proof external housing and means for washing, stabilizing and drying the receiving strip being provided at the outlet from the superimposition zone and upstream of the means, if any, for printing additional information.

10. The apparatus according to claim 1, wherein the negative film exposure means comprise a lens associated to a flash lamp producing flashes at said predetermined intermittent moments.

11. The apparatus according to claim 1, further comprising means for automatically moving the base medium forward over a predetermined distance after each exposure of the film.

12. The apparatus according to claim 1, adapted to be used in the production of identification or similar documents, further comprising additional means for affixing security markings on the receiver strip, with third means for registering the images formed on the strip, with means for cutting the receiving strip with a view to taking a format therefrom, each format corresponding to an image transferred by the negative film, and with means for packing the cut-out formats.

13. The apparatus according to claim 1 or 8, wherein said registering means are constituted by sprocket wheels cooperating with perforations made in the receiving strip.

14. The apparatus according to claim 11, wherein the means provided for packing the formats from the receiving strip consist in means for supplying and superimposing transparent strips of thermoplastic material, sealing and cooling means and means for cutting formats from the packed strip.

15. The apparatus according to claim 1, further comprising means for cutting formats out of the receiving strip, each format corresponding to an image transferred from the negative film, first means feeding a lower strip of thermoplastic material, second means feeding an upper strip of thermoplastic material, means for first superimposing a format to be plastic-laminated on the lower strip of thermoplastic material, means for partially sealing a format superimposed on said lower strip of thermoplastic material, means for pre-heating each strip of thermoplastic material independently before superimposing them, and before heat-sealing the compound assembly resulting from the superimposition of the two thermoplastic strips and the format, heat-sealing and cooling means, means for stepwise moving and means for cutting the plastic-laminated formats.

16. The apparatus according to claim 15, wherein the means for superimposing the upper thermoplastic strip on the format-carrying lower thermoplastic strip comprise a conveying assembly composed of two conveyor belts situated respectively under and above the transport path of the format-carrying lower themoplastic strip, and of rollers permitting to apply a pressure on said compound assembly.

17. The apparatus according to claim 15, further comprising an equipment for sealing the surface of the compound-assembly corresponding to a format which is situated downstream of the means used for pre-heating each one of the thermoplastic strips, on the transport path of the conveying assembly.

18. The apparatus according to claim 17, further comprising means for cooling the compound assembly, which means are situated downstream of the equipment used for sealing the surface of the compound assembly, on the path followed by the conveying assembly.

19. The apparatus according to claim 18, further comprising means for sealing the periphery of the compound assembly around the format, consisting of lower and upper tools moving vertically, downstream of the path followed by the conveying assembly.

20. The apparatus according to claim 15, wherein the means for locally sealing a format superimposed on the lower themoplastic strip, comprise a heating tool, moving vertically inside a slot provided in a plate situated under the path followed by the lower thermoplastic strip in the area where a format is superimposed on a lower thermoplastic strip.

21. The apparatus according to claim 15, wherein the means used for superimposing a format to be plastic-laminated on the lower thermoplastic strip, are combined with means for cutting the receiving strip and comprise a punch which is vertically movable with respect to a die situated between the lower thermoplastic strip and the belt supplying the formats.

22. The apparatus according to claim 15, in which the formats, cut from the receiving strip, are brought individually in pre-cut form in a magazine, characterized in that the means provided for superimposing a format to be plastic-laminated on the lower thermoplastic strip comprise a gripping device constituted by a mechanism with arms mounted for pivoting about fixed axes and carrying members for gripping a format stored inside the magazine and bringing it in superimposition on the lower thermoplastic strip.

23. The apparatus according to claim 16, wherein the pre-heating means which cooperate with the lower thermoplastic strip are situated between the outlet from the means used for superimposing a format on the lower thermoplastic strip and the conveyor assembly used for superimposing the upper thermoplastic strip on the format-carrying lower themoplastic strip.

24. The apparatus according to claim 16, wherein the pre-heating means which cooperate with the upper thermoplastic strip are situated under the part of the conveying belt which is situated above the path followed by the format-carrying thermoplastic strip, and which is used as a guide for the upper thermoplastic strip upstream of the input rollers of the conveyor.

25. A method for data recording and reproduction by transfer, designed to transfer continuously onto a support, by the diffusion-transfer method, from an intermediate negative image, information stored on a base medium, consisting in forming a latent image on a negative film in relation to the information stored on said base, superimposing on the exposed negative film a receiving strip, the negative film and the receiving strip being placed, before being superimposed, in contact with the same treatment bath for developing the negative film, and when superimposing the film on the receiving strip, transferring by diffusion of a positive image on to the receiving strip, the image developed on the negative film, wherein to perform the superimposition-transfer of the negative exposed film and of the receiving strip, the negative film and receiving strip are placed coincidentally at the inlet to the superimposition zone, then the film and the strip are pinched simultaneously where they coincide, in order to be moved simultaneously, and at the outlet from the said superimposition zone, only the receiving strip is pinched and moved, the film being moved by adhering to the receiving strip and detaching itself easily at the outlet from said superimposition zone, the forward movement of the receiving strip is registered in order to control intermittently, at time intervals determined by the detection of markings made in the receiving strip, the printing on the negative film of a set of information stored discontinuously on the base medium.

26. The method of claim 25, further comprising the following steps: cutting into individual formats the receiving strip, downstream of the superimposition zone, each format corresponding to an image transferred by the negative film, and introducing the series of formats to be plastic-laminated stepwise successively between a lower thermoplastic strip and an upper thermoplastic strip, wherein the next format to be plastic-laminated is first superimposed on the lower thermoplastic strip, after what the said format is partly sealed on said lower thermoplastic strip, on the one hand the lower thermoplastic strip on which the formats have been locally fixed, and on the other hand the upper thermoplastic strip, prior to the superimposition of the latter on the lower thermoplastic strip, are independently pre-heated, the compound assembly resulting from the superimposition of the two pre-heated thermoplastic strips and the format is heat-sealed and cooled, and the plastic-laminated formats are cut.

27. The method of claim 26, wherein a pressure is applied on the compound assembly throughout a first sealing operation of the compound assembly surface corresponding to a format and a cooling operation consecutive to said first surface sealing operation.

28. An apparatus for data recording and reproduction by transfer, used for continuously transferring onto a support, by the photographic process of transfer by diffusion from an intermediate negative image data discontinuously stored on a base medium, and comprising a device for forming a latent image on a negative film according to data stored on the base medium, a device for superimposing a receiving strip on the exposed negative film, and means for placing, before their superimposition, the exposed negative film and the receiving strip, in contact with a single treatment bath used for developing the negative film and, when superimposing the negative film on the receiving strip, for transferring onto said strip by diffusion a positive image from that developed on the negative film, wherein the device for superimposing the exposed negative film and the receiving strip comprises a first pair of transport rollers placed at the inlet of the zone of superimposition of the printed negative film and the receiving strip for gripping and carrying simultaneously the superimposed strip and film, and a second pair of transport rollers placed at the outlet of said superimposition zone, for gripping and carrying the receiving strip only, the film itself being moved by adhering to the receiving strip and detaching itself at the outlet from the said superimposition zone, first registering means for sensing the advancing movement of the receiving strip are provided for controlling intermittently, at time intervals determined by the detection of guidemarks formed on the receiving strip, the production on the negative film of an image comprising a set of information stored discontinuously on the base medium further comprising means for storing additional information from the base medium during exposure of the negative film, and second registering means, synchronized with the first registering means provided for sensing the forward movement of the receiving strip, said second registering means being situated downstream of the superimposition zone, for controlling the registered printing on the receiver strip of the stored additional information wherein the first and second registering means are constituted by sprocket wheels cooperating with perforations made in the receiving strip said apparatus being adapted to be used in the production of identification or similar documents, further comprising additional means for affixing security markings on the receiver strip, with third means for registering the images formed on the strip, with means for cutting the receiving strip with a view to taking a format therefrom, each format corresponding to an image transferred by the negative film, and with means for packing the cut-out formats.

* * * * *